(12) United States Patent
Lao (10) Patent No.: US 6,640,052 B1
(45) Date of Patent: Oct. 28, 2003

(54) DUAL TEMPERATURE WATER DISPENSING DEVICE

(75) Inventor: Kun Song Lao, Chong Ho (TW)

(73) Assignee: Kun Song Technical Company, Taipei (TW)

( * ) Notice: Subject to any disclaimer, the term of this patent is extended or adjusted under 35 U.S.C. 154(b) by 25 days.

(21) Appl. No.: 10/156,268

(22) Filed: May 24, 2002

(51) Int. Cl.[7] .................................................. F24H 1/18
(52) U.S. Cl. ........................ 392/449; 392/450; 202/202
(58) Field of Search ................................. 392/449, 450; 202/187, 188, 202

(56) References Cited

U.S. PATENT DOCUMENTS

| | | | | |
|---|---|---|---|---|
| 3,935,077 A | * | 1/1976 | Dennison | 202/83 |
| 4,269,663 A | * | 5/1981 | McFee | 202/185.3 |
| 4,915,793 A | * | 4/1990 | Chou | 202/202 |
| 5,059,287 A | * | 10/1991 | Harkey, Sr. | 203/1 |
| 5,290,402 A | * | 3/1994 | Tsai | 202/181 |

* cited by examiner

Primary Examiner—Thor Campbell (57) ABSTRACT

A water dispensing device includes a cold and a hot water tanks received in a housing, and a coupler coupled to the water tanks and coupled to a container. A device may be used for heating the water in the container to generate steam to the coupler, and another device may be used for cooling the steam to generate a distilled water to the water tanks. Two pumps may couple the tanks to a nozzle for outward supplying water. A device may be coupled to the container for evacuating the particles or the waste water from the container.

10 Claims, 8 Drawing Sheets

DUAL TEMPERATURE WATER DISPENSING DEVICE

BACKGROUND OF THE INVENTION

1. Field of the Invention

The present invention relates to a water dispensing device, and more particularly to a dual temperature water dispensing device.

2. Description of the Prior Art

Typical water dispensing devices comprise a heater for heating or boiling the water and for providing or supplying the heated or hot water to the users. Some of the water dispensing devices may further include a cold water reservoir for receiving the cold water therein. However, the cold water normally has not been heated or vaporized by the heater and is normally the raw water. In addition, the particles or the other contaminants or the waste water may not be discharged from the water containers or reservoirs.

The present invention has arisen to mitigate and/or obviate the afore-described disadvantages of the conventional water dispensing devices.

SUMMARY OF THE INVENTION

The primary objective of the present invention is to provide a water dispensing device including a hot water tank and a cold water tank for receiving the hot water and the cold water that have been distilled.

The other objective of the present invention is to provide a water dispensing device including a mineral product or ore disposed in the distilled water for providing the mineral substances to the distilled water.

The further objective of the present invention is to provide a water dispensing device including a evacuating device for discharging the waste water in the container.

In accordance with one aspect of the invention, there is provided a water dispensing device comprising a housing including a chamber formed therein, a cold water tank and a hot water tank, a coupler including two first ports coupled to the water tanks respectively, and including a second port, a container for receiving water therein, and including an outlet coupled to the second port of the coupler, a device for heating the water in the container to generate and supply steam to the coupler, and another device for cooling the steam to form and supply a distilled water to the water tanks respectively.

The coupler includes a partition provided between the first ports for guiding the distilled water to flow to the first ports respectively.

The housing includes a nozzle attached thereto, and two pumps coupling the tanks to the nozzle, for supplying water to the nozzle.

A filter may further be provided for coupling the container to a water reservoir, and a control valve disposed between the filter and the container for controlling the water to flow into the container.

A device may further be provided for evacuating water from the container. The container includes a bottom portion having a mouth provided thereon, the evacuating device includes a casing coupled to the mouth, and a ball valve rotatably received in the casing for controlling the water to flow out of the mouth of the container.

A further device may be provided for rotating the ball valve relative to the casing, and includes a shaft extended from the ball valve, and a motor coupled to the shaft for rotating the ball valve, a gear attached to the shaft, and a gearing device attached to the motor and engaged with the gear, for allowing the ball valve to be rotated by the motor.

One or more mineral products may further be disposed in the water tank for supplying the mineral substances to the water.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
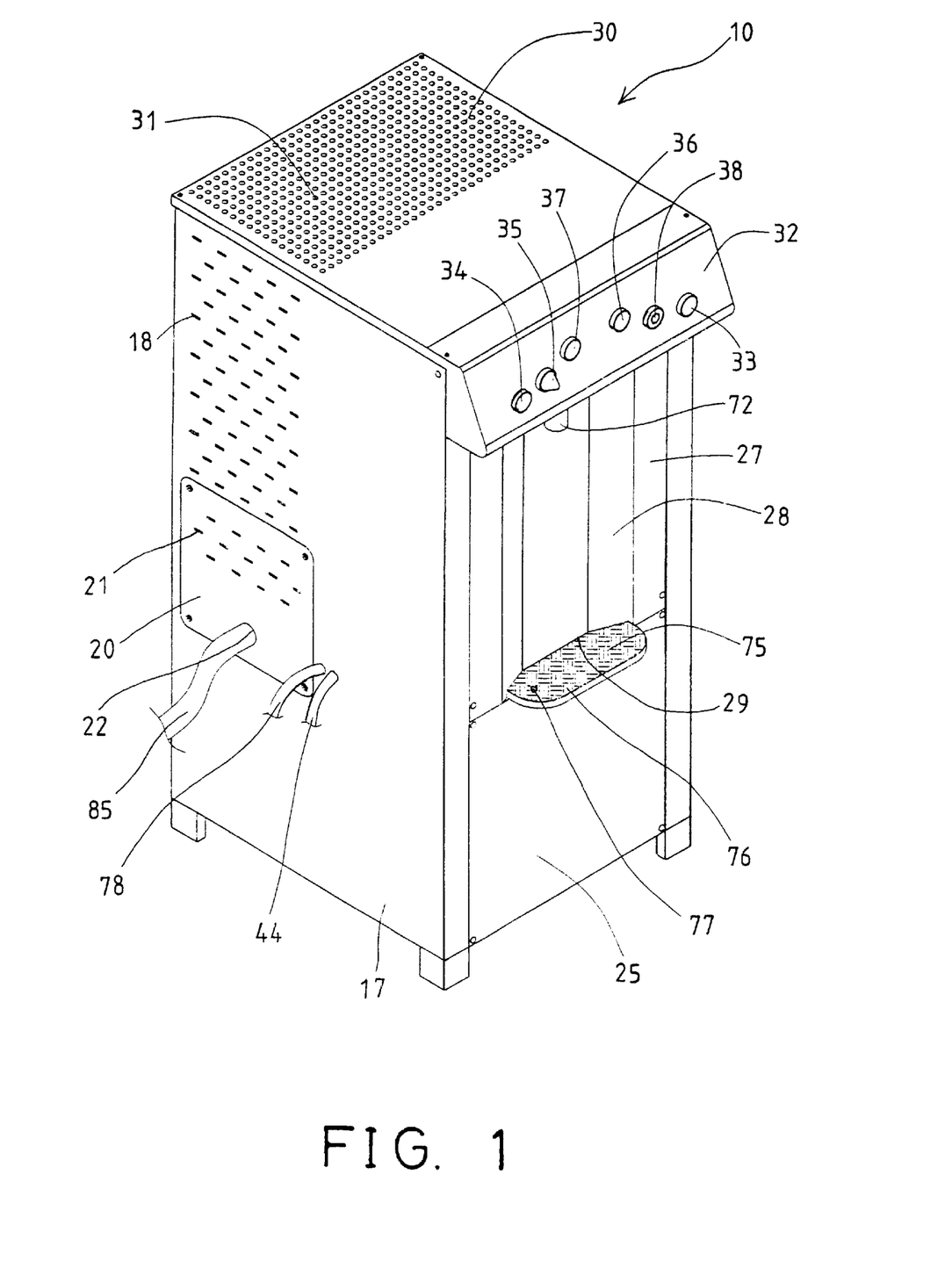
FIG. 1 is a perspective view of a water dispensing device in accordance with the present invention.
Figure 2:
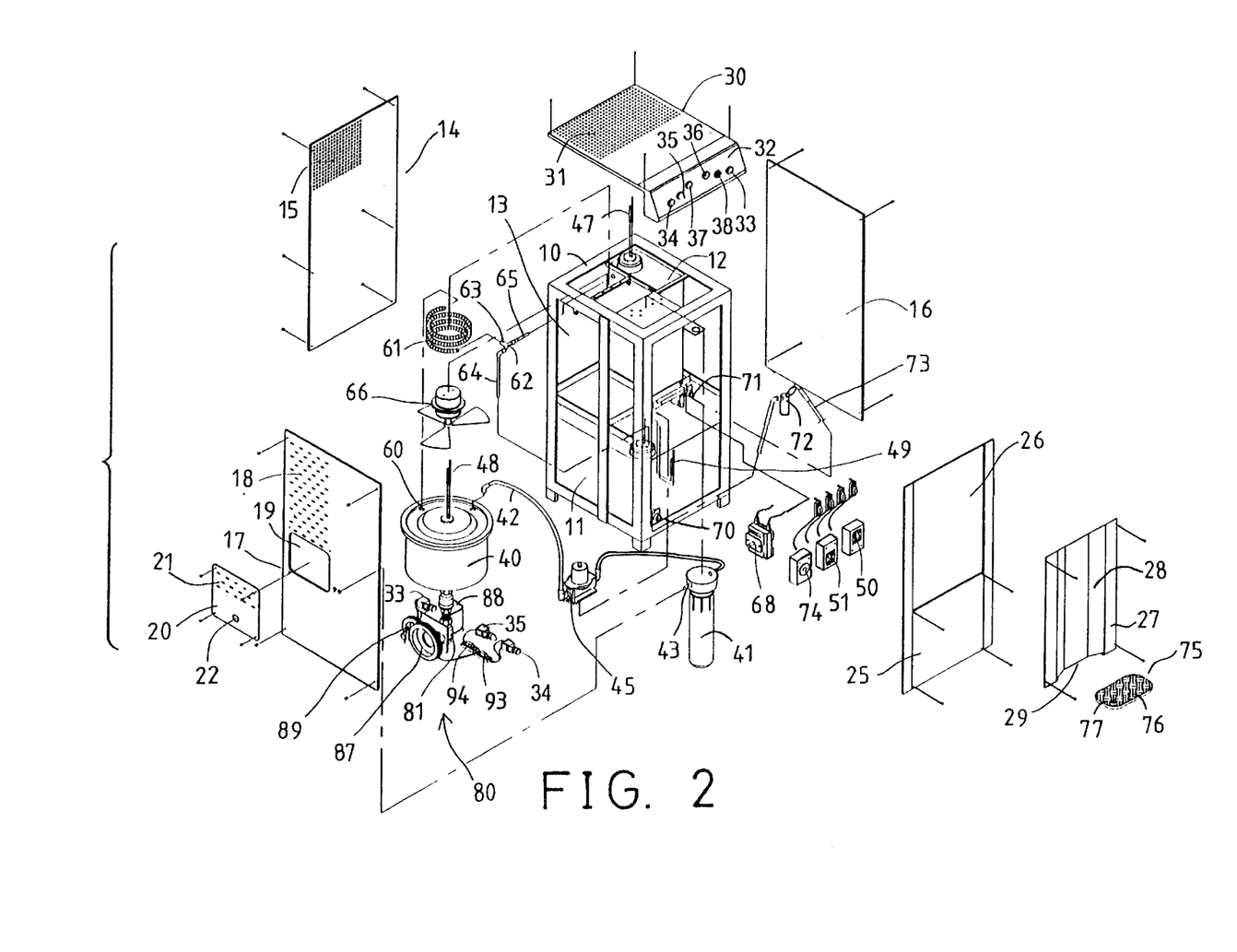
FIG. 2 is an exploded view of the water dispensing device.

Referring to the drawings, and initially to FIGS. 1 and 2, a water dispensing device in accordance with the present invention comprises a housing 10 including a cold water tank 11 disposed in the lower portion of the inner chamber 13 of the housing 10, and a hot water tank 12 disposed in the upper portion of the inner chamber 13 of the housing 10 and preferably having a volume less than that of the cold water tank 11. A rear panel 14, and a side panel 17 and a top panel 30 are attached to the housing 10 and each has a number of orifices 15, 18, 31 formed therein for air circulation or heat dissipating purposes. Another side panel 16 may be attached to the other side of the housing 10.

The side panel 17 includes an aperture 19 formed therein and communicating with the chamber 13 of the housing 10. A cover 20 may be detachably secured to the side panel 17 for enclosing the aperture 19 of the side panel 17, and preferably includes a number of orifices 21 formed therein for air circulation or heat dissipating purposes, and includes a hole 22 formed therein. A front panel 25 is secured to the front portion of the housing 10, and includes an opening 26 formed in the upper portion thereof. A cap 27 is secured to the upper portion of the front panel 25 for blocking the opening 26 thereof, and includes a middle portion 28 concave inward of the housing 10 for forming a space 29 in the front portion thereof.

A container 40 and a filter 41 are received in the chamber 13 of the housing 10, and coupled together with a hose 42. The filter 41 includes an inlet 43 coupled to a water reservoir with a hose 44 (FIG. 1), for allowing the water to flow to the container 40 via the filter 41. A control valve 45, such as a solenoid valve 45 may be coupled between the filter 41 and the container 40 for controlling the water flowing into the container 40. A heater 46 is disposed in the container 40 for heating or boiling the water.

Figure 8:
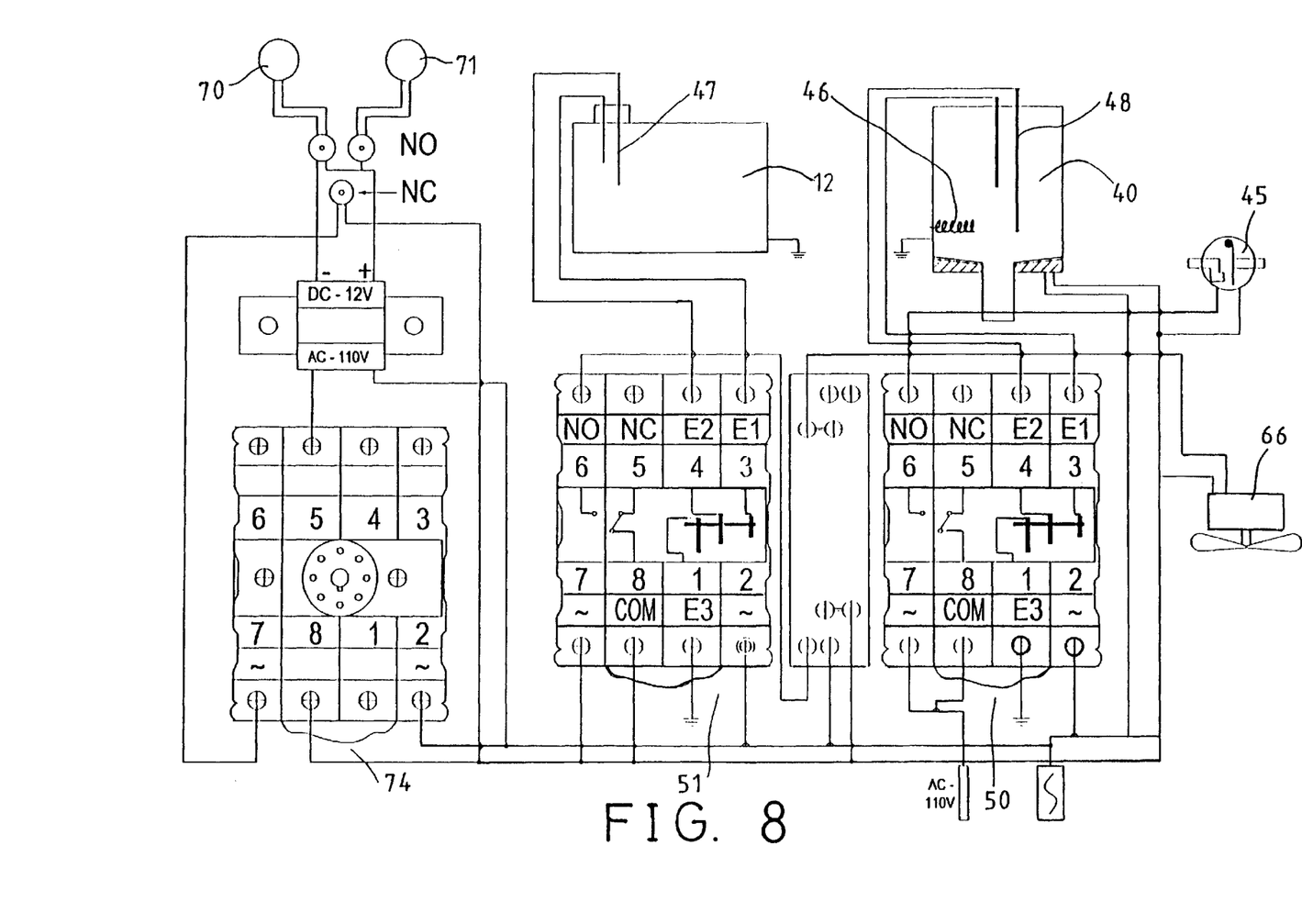
FIG. 8 is a schematic view illustrating the electric circuit for controlling the water dispensing device.

Three probes or detectors 47, 48, 49 (FIGS. 2, 8) are engaged into the hot water tank 12 and the container 40 and the cold water tank 11 respectively, for detecting the water levers of the tanks 11, 12 and the container 40. One or more control devices 50, 51 may further be provided and coupled to the detectors 47, 48, 49 and the control valve 45 for controlling the water supplied to the container 40, and/or to the tanks 11, 12. The container 40 includes an outlet 60 formed in the upper portion thereof and coupled to one end of a pipe 61 for allowing the vapor or steam generated by the heater 46 to flow through the pipe 61.

Figure 3:
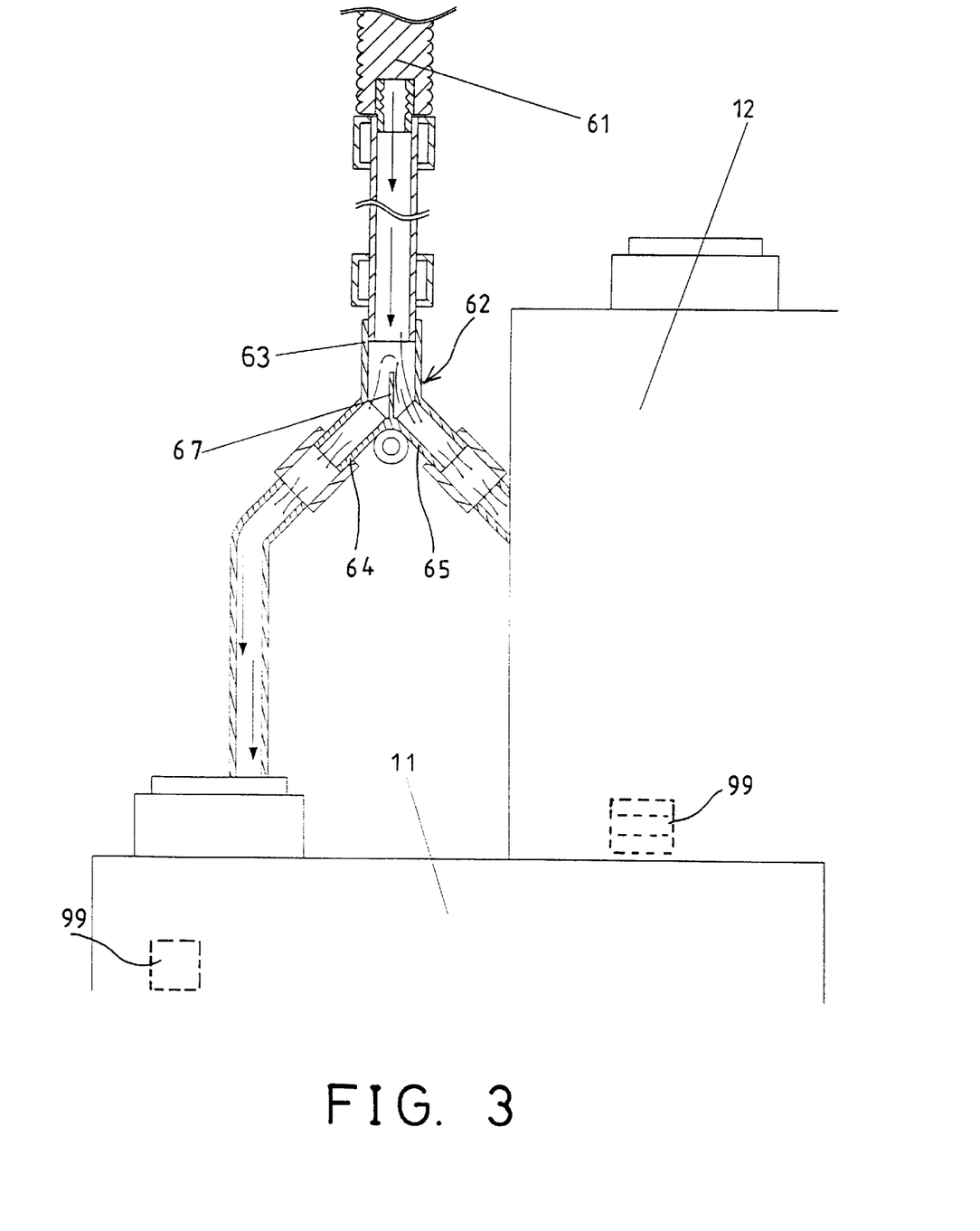
FIG. 3 is a partial cross sectional view of the water dispensing device.
Figure 4:
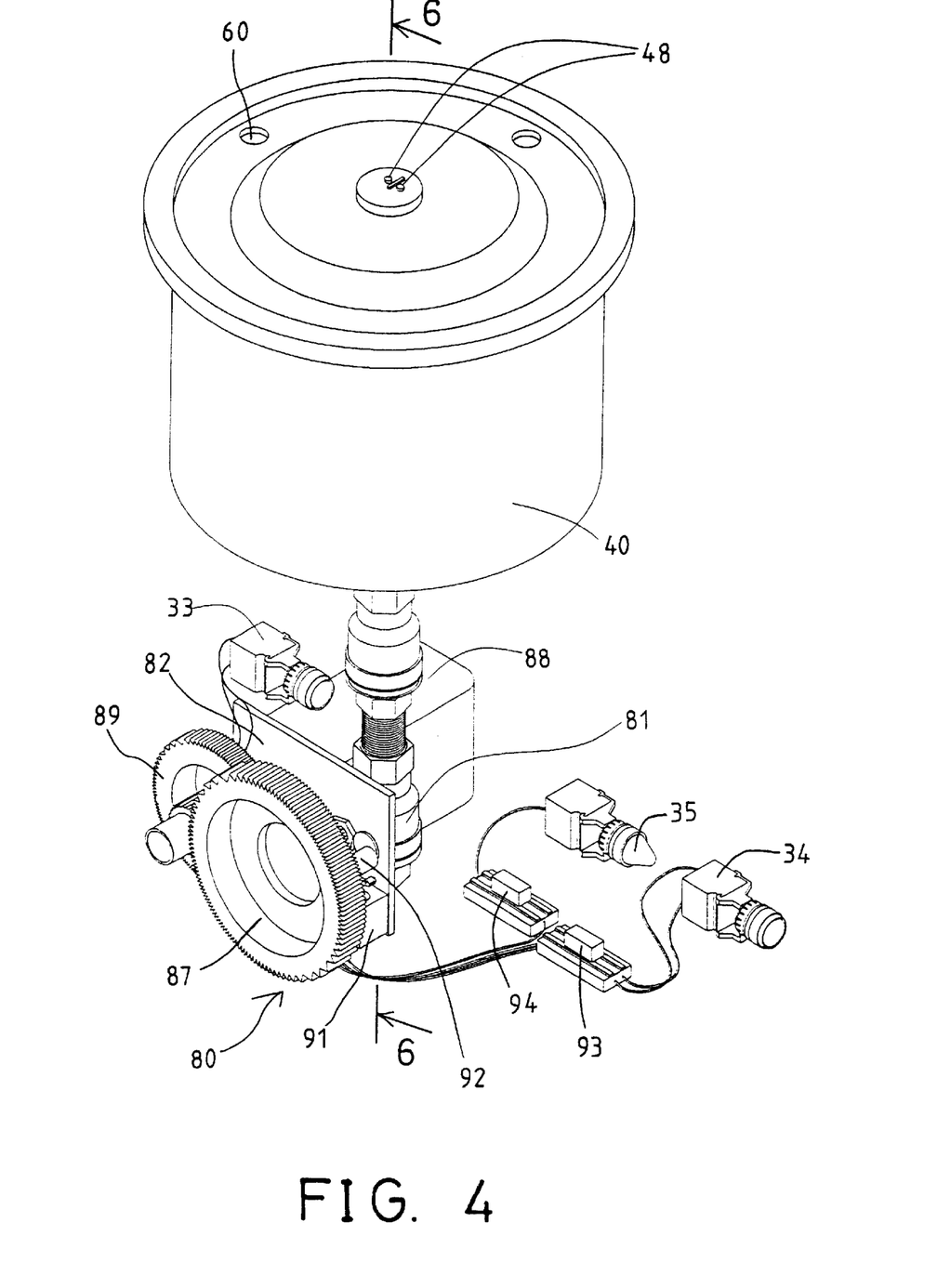
FIG. 4 is a perspective view of a container for receiving and boiling the water, and a water evacuating device for the container of the water dispensing device.

The pipe 61 includes the other end coupled to a port 63 of a coupler 62 which has two ports 64, 65 coupled to the tanks 11, 12 respectively (FIG. 3), for allowing the vapor or the steam and/or the distilled water to flow into the tanks 11, 12 respectively. A cooling device, such as a cooling fan 66 is disposed above the container 40 and disposed close to the pipe 61 for cooling the vapor or the steam flowing through the pipe 61. As best shown in FIG. 3, the coupler 62 includes a partition 67 provided in the middle portion and disposed between the ports 64, 65 for preventing the distilled water to flow from or between the ports 64, 65, or for guiding the distilled water to flow to the ports 64, 65 respectively. The tanks 11, 12 may each further include an ore or a mineral product 99 therein, such as the saponite, the smectite, etc., for providing the mineral substances to the cold and the hot waters contained in the tanks 11, 12.

The tank 12 may be made of a heat insulating material and/or may include another heater (not shown) for maintaining the hot water in the tank 12 in a predetermined temperature. A temperature sensor or controller 68 may further be provided and coupled to the tank 12 for detecting or controlling the hot water at the predetermined temperature. Two motors or pumps 70, 71 are coupled to the tanks 11, 12 and are coupled to a faucet or a nozzle 72 with hoses 73, for pumping and supplying or outputting the cold water and/or the hot water to the nozzle 72. A timer 74 may further be provided and coupled to the pumps 70, 71 for controlling the operation of the pumps 70, 71.

The nozzle 72 is preferably received in the space 29 formed in the front portion of the housing 10 or of the cap 27 of the front panel 25. A shelf 75 may be disposed in the lower portion of the space 29 of the housing 10 for supporting the cups or the like, and includes a pad 76 provided on top thereof for stably supporting the cups and/or for absorbing the water from the nozzle 72, and includes an outlet 77 coupled to a hose 78 (FIG. 1) for water draining purposes.

Figure 5:
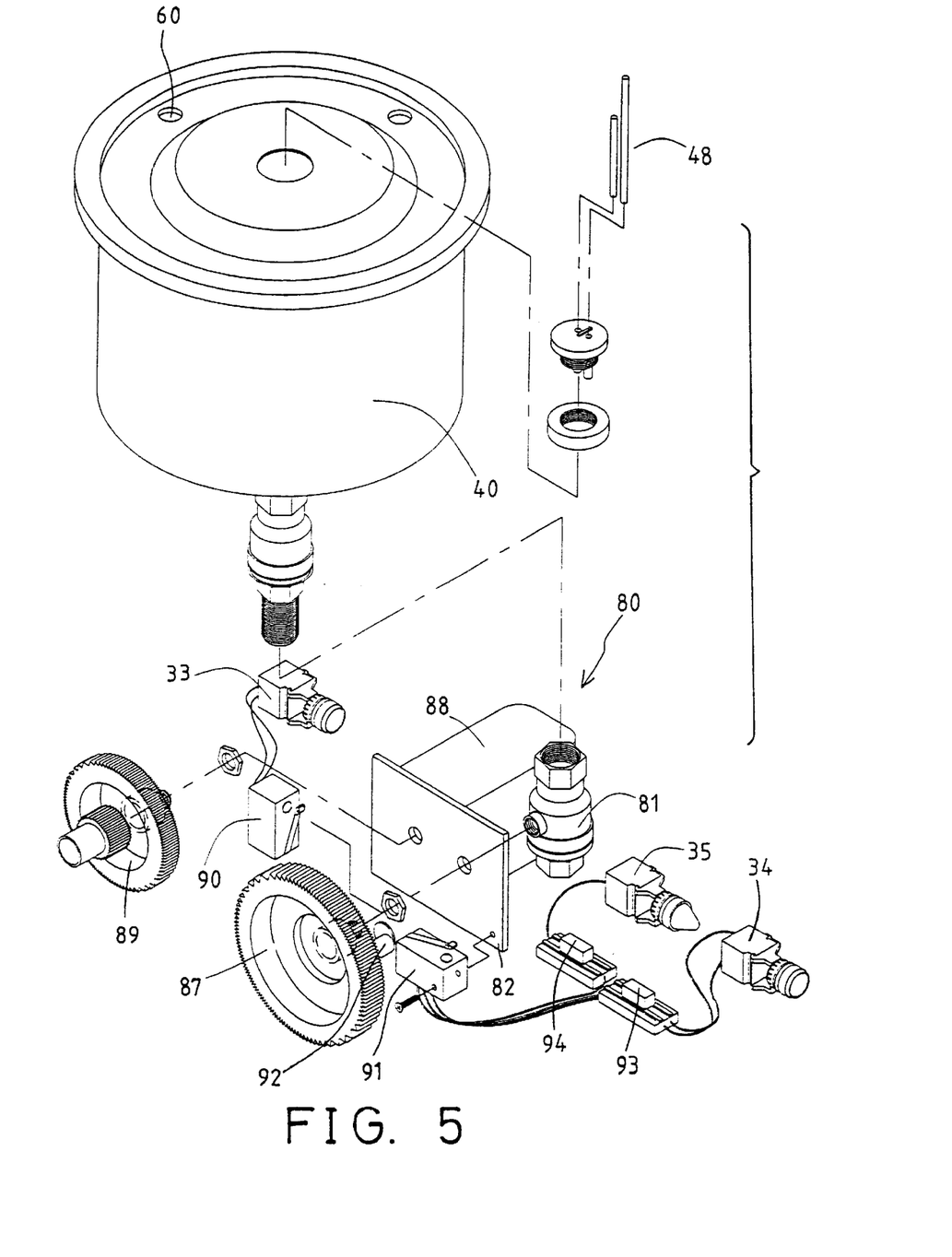
FIG. 5 is a partial exploded view of the container and the water discharging device of the water dispensing device.
Figure 6:
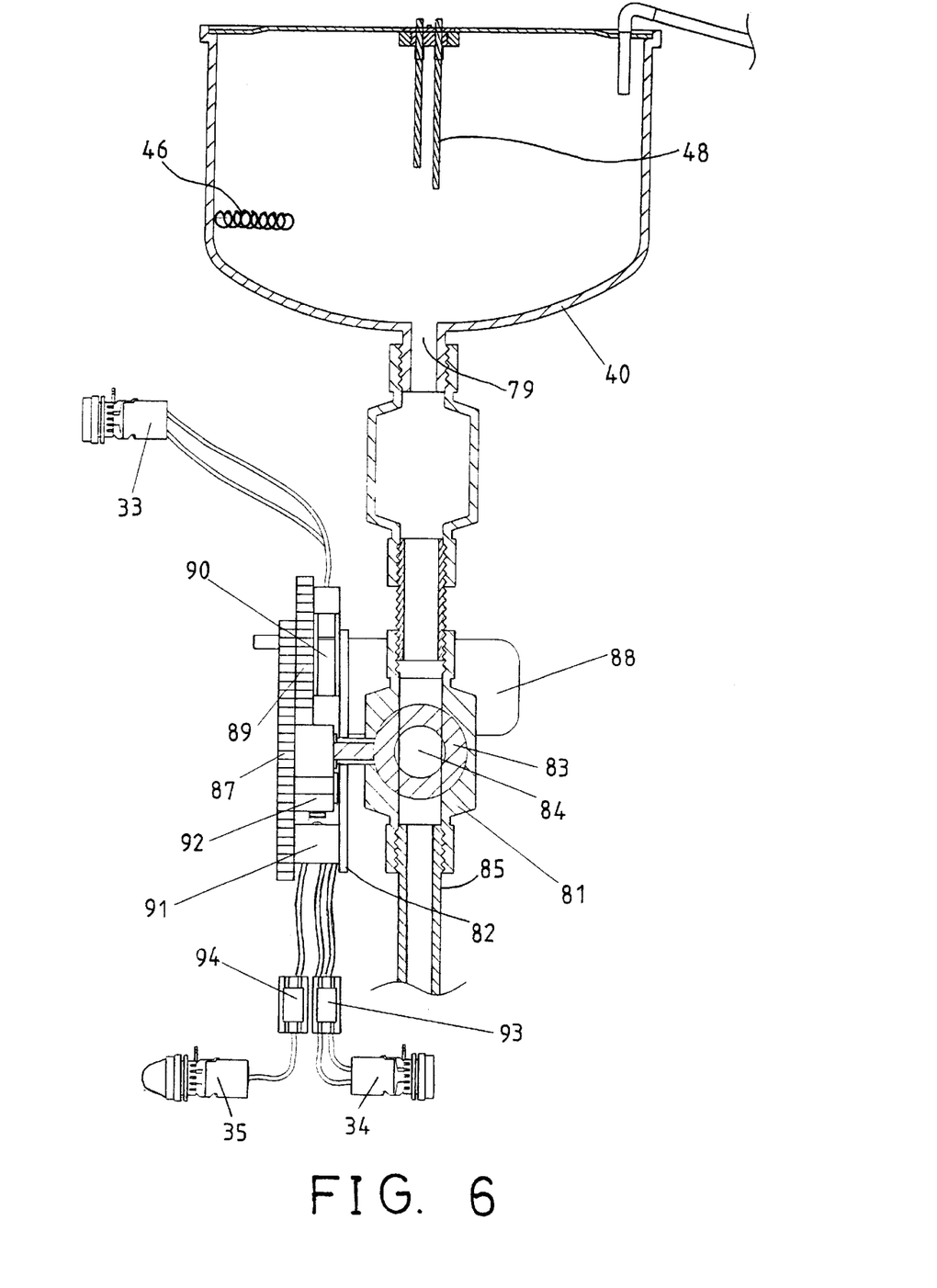
FIG. 6 is a partial cross sectional view taken along lines 6—6 of FIG. 4.

As best shown in FIG. 6, the container 40 includes a mouth 79 formed or provided in the bottom portion thereof for receiving or collecting the particles or the like that may be supplied into the container 40. As shown in FIGS. 2 and 4–7, an evacuating device 80 may further be provided for evacuating the particles or the waste water from the bottom of the container 40, and includes a casing 81 coupled to the mouth 79 of the container 40 and coupled to a plate 82 and having a ball valve 83 rotatably received therein which has a passage 84 formed therein. Another hose 85 is coupled to the casing 81 for discharging the waste water from the container 40.

Figure 7:
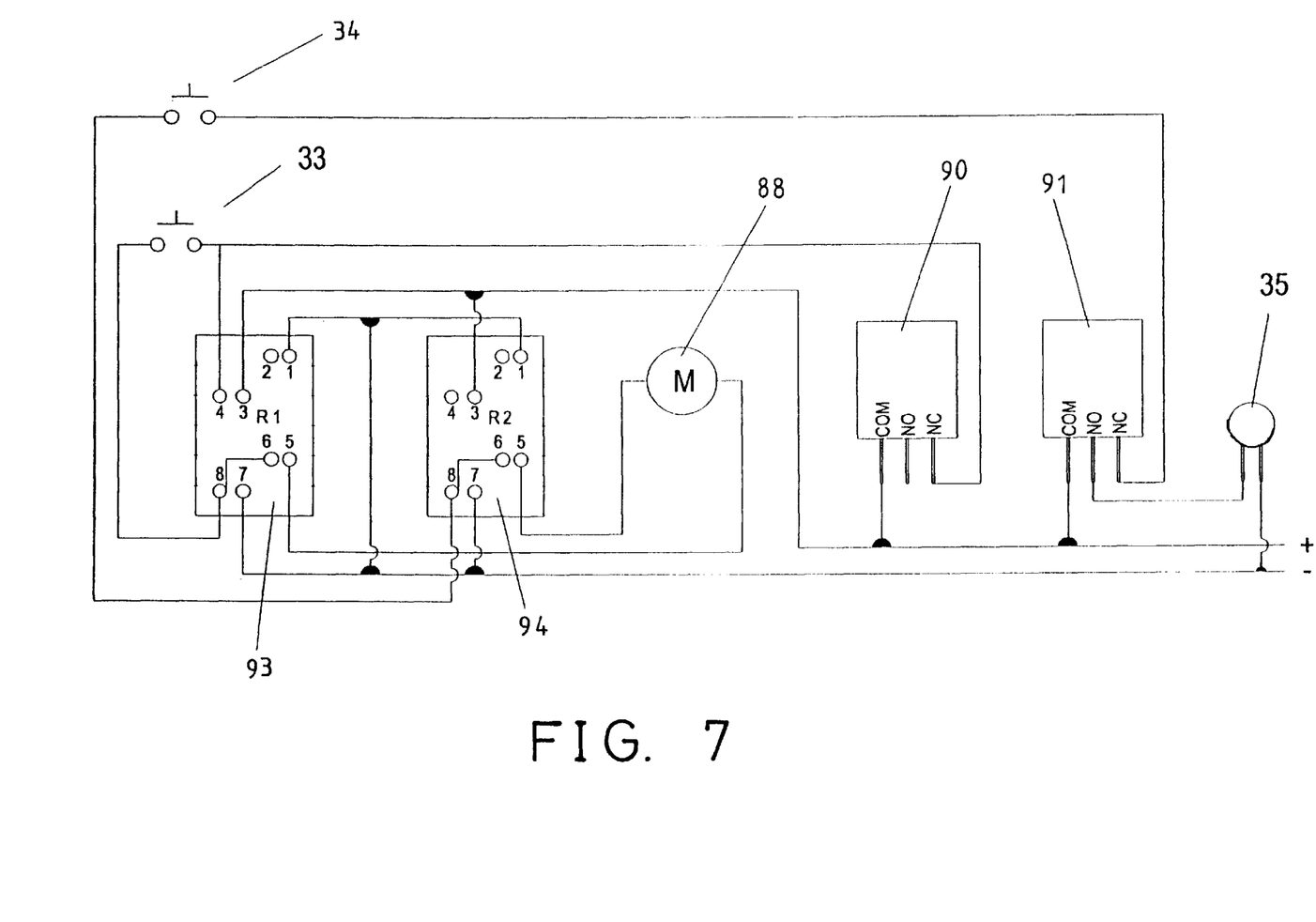
FIG. 7 is a schematic view illustrating the electric circuit for controlling the water discharging device of the water dispensing device.

The ball valve 83 includes a shaft 86 extended therefrom and secured to a gear 87. A motor 88 is secured to the plate 82 and coupled to the gear 87 with a gearing device 89, such that the ball valve 83 may be rotated by the motor 88 in order to control the water flowing out of the hose 85. Alternatively, the motor 88 may also be directly coupled to the ball valve 83 for actuating or operating the ball valve 83. Two switches, such as the microswitches 90, 91 are secured to the plate 82, the gear 87 includes a pin 92 extended therefrom for engaging with either of the switches 90, 91 and for controlling the operation of the motor 88 to the ball valve 83.

For example, when the pin 92 is engaged with the switch 90, the passage 84 of the ball valve 83 may be opened for allowing the waste water to flow out through the hose 85. On the contrary, when the pin 92 is engaged with the other switch 91, the passage 84 of the ball valve 83 may be closed for blocking the hose 85 and for preventing the waste water from flowing out through the hose 85. As shown in FIGS. 1, 2, 7, the top panel 30 may include a control panel 32 provided on the front portion thereof, and having one or more switches 33, 34 coupled to the switches 90, 91 and the motor 88 directly, for indirectly via relays 93, 94 for controlling the motor 88 to open and to close the ball valve 83.

An indicating light 35 may further be provided for is indicating that the motor 88 has stopped, and/or the ball valve 83 has closed, and/or the evacuating device 80 is switched off. The control panel 32 may further includes one or more switches 35, 36 for controlling the outlet of the cold water and/or the hot water through the nozzle 72. A safety switch 38 may further be provided for allowing either or both the switches 35, 36 to be actuated only after the safety switch 38 has been actuated or depressed.

It is to be noted that the filter 41, the control valve 45, the evacuating device 80, the temperature controller 68, the control devices 50, 51, and/or the timer 74 may be optionally or selectively, but not necessarily be provided and coupled to the above described elements. The most important characteristic of the water dispensing device is that the coupler 62 allows the distilled water to flow into the cold water tank 11 and the hot water tank 12 respectively, such that both the hot water and the cold water are distilled and may be safely drunk by the users.

Accordingly, the water dispensing device in accordance with the present invention includes a hot water tank and a cold water tank for receiving the hot water and the cold water that have been distilled, or may include a mineral product or ore disposed in the distilled water for providing the mineral substances to the distilled water, or may include an evacuating device for discharging the waste water in the container.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water dispensing device comprising:

a housing including a chamber formed therein, a cold water tank and a hot water tank, a coupler including two first ports coupled to said water tanks respectively, and including a second port, a container for receiving water therein, and including an outlet coupled to said second port of said coupler, means for heating the water in said container to generate and supply steam to said coupler, means for cooling the steam to form and supply a distilled water to said water tanks respectively, and a mineral product disposed in said hot water tank.

2. A water dispensing device comprising:

a housing including a chamber formed therein, a cold water tank and a hot water tank, a coupler including two first ports coupled to said water tanks respectively, and including a second port, and including a partition provided between said first ports, a container for receiving water therein, and including an outlet coupled to said second port of said coupler, means for heating the water in said container to generate and supply steam to said coupler, and means for cooling the steam to form and supply a distilled water to said water tanks respectively, and said partition being provided for guiding the distilled water to flow to said first ports respectively.

3. A water dispensing device comprising:

a housing including a chamber formed therein, and including a nozzle attached thereto, a cold water tank and a hot water tank, two pumps coupling said tanks to said nozzle, for supplying water to said nozzles, a coupler including two first ports coupled to said water tanks respectively, and including a second port, a container for receiving water therein, and including an outlet coupled to said second port of said coupler, means for heating the water in said container to generate and supply steam to said coupler, and means for cooling the steam to form and supply a distilled water to said water tanks respectively.

4. A water dispensing device comprising:

a housing including a chamber formed therein, a cold water tank and a hot water tank, a coupler including two first ports coupled to said water tanks respectively, and including a second port, a container for receiving water therein, and including an outlet coupled to said second port of said coupler, means for heating the water in said container to generate and supply steam to said coupler, means for cooling the steam to form and supply a distilled water to said water tanks respectively, a filter coupling said container to a water reservoir, and a control valve disposed between said filter and said container for controlling the water to flow into said container.

5. A water dispensing device comprising:

a housing including a chamber formed therein, a cold water tank and a hot water tank, a coupler including two first ports coupled to said water tanks respectively, and including a second port, a container for receiving water therein, and including an outlet coupled to said second port of said coupler, mean for heating the water in said container to generate and supply steam to said coupler, means for cooling the steam to form and supply a distilled water to said water tanks respectively, and means for evacuating water from said container.

6. The water dispensing device according to claim 5, wherein said container includes a bottom portion having a mouth provided thereon, said evacuating means includes a casing coupled to said mouth, and a ball valve rotatably received in said casing for controlling the water to flow out of said mouth of said container.

7. The water dispensing device according to claim 6 further comprising means for rotating said ball valve relative to said casing.

8. The water dispensing device according to claim 7, wherein said rotating means includes a shaft extended from said ball valve, and a motor coupled to said shaft for rotating said ball valve.

9. The water dispensing device according to claim 8, wherein said rotating means further includes a gear attached to said shaft, and a gearing device attached to said motor and engaged with said gear, for allowing said ball valve to be rotated by said motor.

10. A water dispensing device comprising:

a housing including a chamber formed therein, a cold water tank and a hot water tank, a coupler including two first ports coupled to said water tanks respectively, and including a second port, a container for receiving water therein, and including an outlet coupled to said second port of said coupler, means for heating the water in said container to generate and supply steam to said coupler, and mean for cooling the steam to form and supply a distilled water to said water tanks respectively, and a mineral product disposed in said cold water tank.

\* \* \* \* \*